United States Patent [19]
Genz et al.

[11] Patent Number: 4,916,531
[45] Date of Patent: Apr. 10, 1990

[54] COLOR VIDEO PROCESSING CIRCUITRY

[75] Inventors: Suzanne E. Genz, Sherborn; John R. Fierke, Southboro, both of Mass.

[73] Assignee: Data Translation, Inc., Marlboro, Mass.

[21] Appl. No.: 172,017

[22] Filed: Mar. 23, 1988

[51] Int. Cl.⁴ .......................... H04N 1/46; G06F 7/52
[52] U.S. Cl. ........................................ 358/75; 358/78; 364/764
[58] Field of Search ............................ 358/75, 78, 80; 364/764

[56] References Cited

U.S. PATENT DOCUMENTS

| | | | |
|---|---|---|---|
| 4,183,046 | 1/1980 | Dalke et al. | 358/80 |
| 4,500,919 | 2/1985 | Schreiber | 358/80 |
| 4,500,972 | 2/1985 | Kuhn et al. | 358/75 |
| 4,731,662 | 3/1988 | Udagawa et al. | 358/80 |
| 4,768,089 | 8/1988 | Kato | 358/80 |
| 4,805,016 | 2/1989 | Kato | 358/80 |

OTHER PUBLICATIONS

James D. Foley et al., *Fundamentals of Interactive Computer Graphics*, Addison–Wesley, 1982, pp. 602–622.
Yu–Ichi Ohta et al., "Color Information for Region Segmentation", *Computer Graphics and Image Processing*, vol. 13, No. 3, Jul. 1980, pp. 222–241.
Alvy Ray Smith, "Color Gamut Transform Pairs", *Proc. of Annu. Conf. on Compu. Graph. and Interact Tech.*, Aug. 23–25, 1978, published by Siggraph–Acm, N.Y., N.Y., vol. 12, No. 3, Aug. 1978, pp. 12–19.

*Primary Examiner*—James J. Groody
*Assistant Examiner*—Randall S. Svihla

[57] ABSTRACT

Circuitry for converting digital red, green, blue (RGB) inputs into digital saturation and hue outputs comprising hardwired digital components connected to receive the digital RGB inputs and to perform arithmetic manipulations of them so as to provide a digital saturation output representing saturation for the RGB inputs and to provide a digital first intermediate output, and a first look-up memory storing digital hue data representing hue of the digital RGB inputs at addresses corresponding to values of the digital first intermediate output, the look-up memory being connected to the hardwired digital components to be addressed by the digital intermediate output, the memory providing a digital hue output. Also disclosed are: circuitry for converting digital hue data, digital saturation data, and brightness-related digital data into digital RGB outputs using a further look-up memory that is addressed by the hue data and provides an intermediate output used with the saturation data and brightness-related data by hardwired components to provide digital RGB outputs; a fixed point divider including bit subcircuits that each include an adder, a multiplexer and a bit shifting element; and a floating point divider that decodes dividend and divisor signals to provide a quotient exponent signal and left-justifies the dividend and divisor signals to obtain dividend mantissa and divisor mantissa signals that are divided to obtain a mantissa quotient signal.

64 Claims, 9 Drawing Sheets

COLOR VIDEO PROCESSING CIRCUITRY

FIELD OF THE INVENTION

The Invention relates to circuitry for converting red, green, blue video digital signals into digital signals relating to other color parameters and vice versa.

BACKGROUND OF THE INVENTION

A frame grabber processing board is used to enhance or otherwise modify a video image. It digitizes an input analog video signal and stores digitized data for an entire screen in a frame buffer. The stored digitized data can then be analyzed or modified to achieve desired results when converted back to an analog video signal and outputted to a cathode ray tube (CRT) display.

A color video input signal includes three analog signals (for red, green, and blue), the magnitude of the signal indicating the brightness of the red, green, or blue light making up the image. What the human eye perceives as yellow, pink, purple, etc. on a color CRT screen are actually mixtures of the primary colors: red, green, blue. Because humans do not perceive colors as relative proportions of red, green, and blue (RGB) light, processing color video signals is not straightforward using RGB data.

RGB data have been converted in the prior art using known equations implemented in software into hue (the actual color), saturation (the deepness of color; e.g., pink is desaturated red), and intensity (the light energy of a color. i.e.. brightness) data. These data describe the color that is viewed in terms that more directly relate to the viewer s perception, permitting the user to identify and modify the colors more easily. Conversions between the RGB color model and other color models are described in Foley, J. D. *Fundamentals of Interactive Computer Graphics*, (Addison-Wesley 1982) pp. 602–622; Ohta, Y. et al., "Color Information for Region Segmentation", *Computer Graphics and Image processing*. Vol 13, (1980), pp. 222–241; and Smith, A. R., "Color Gamut Transform Pairs" *Proc. of Annu. Conf. on Comput. Graph. and Interact Tech.*, Aug. 23–25, 1978, published by SIGGRAPH-ACM NY, NY, pp. 12–19.

Dalke et al. U.S. Pat. No. 4,183,046 recites transforming source data representing an actual image using software, firmware, or hardware into digital hue, saturation and intensity (HSI) data stored in a memory. The stored saturation and hue data are used to address red, green, and blue look-up tables (programmable read only memories) to obtain red digital data, green digital data, and blue digital data that are in proper proportion to provide the desired color when converted to RGB analog signals and displayed on a CRT. The stored intensity data are used to control the magnitudes of the RGB analog signals.

SUMMARY OF THE INVENTION

In one aspect our invention features in general converting digital red, green, blue (RGB) inputs into digital saturation and hue outputs by using hardwired components that perform arithmetic functions cn the digital RGB inputs so as to provide a digital saturation output and a digital hue intermediate output. The digital hue intermediate output is used to address a look-up table memory that stores and outputs hue data. The saturation and hue outputs can thus be provided in real time and with greater accuracy for a given amount of hardware than would be provided by simply using RGB inputs to directly address a look-up table memory to obtain the hue and saturation outputs.

In preferred embodiments the hardwired components also provide a digital intensity output; the hue data stored in the look-up table memory are related to the hue intermediate outputs by trigonometric functions; the RGB digital inputs are averaged to provide an intensity output; a minimum decoder circuit is used to identify the minimum of the RGB inputs and use the minimum to obtain the saturation output; and a fixed point divider is used to provide the saturation output; and a floating point divider is used to provide the intermediate output with a value equal to (2R-G-B)/(G-B).

In another aspect our invention features in general converting digital saturation data (S), hue data (H), and data relating to the relative brightness of a signal (e.g., intensity, I) into digital RGB outputs by using a look-up table memory that is addressed by the hue data to output digital intermediate data (K) and hardwired digital components that receive the digital saturation data and intermediate data and perform arithmetic functions on them to provide digital RGB outputs. The RGB outputs can thus be provided in real time and with greater accuracy for a given amount of hardware than would be provided by simply using hue and saturation inputs to directly address a look-up memory to obtain RGB outputs. In addition, because the RGB outputs are in digital form, they can either be directly converted to analog signals and displayed or can be stored or processed in RGB form.

In preferred embodiments the digital intermediate data include color type data related to the hue data by trigonometric functions and color control data used to control switching circuitry to map intermediate color data signals to RGB outputs; one intermediate color data signal, L, equals I−IS; a second intermediate color data signal, M, equals I+ISK; the third intermediate color data signal, N, equals 3I−L−M.

In a further aspect our invention features in general a divider that divides a digital dividend signal input by a digital divisor signal input and provides an N-bit quotient. The divider employs a plurality of bit subcircuits that each outputs a single bit output of the quotient. Each subcircuit includes an adder configured to subtract a divisor signal from a dividend signal and to output a sum signal and a carry-out bit. The carry-out bit is used as one bit of the quotient and to control a multiplexer to output either the dividend signal or the sum of the adder. The multiplexer's output is then shifted one bit with respect to the divisor signal before being passed on as the dividend signal to the adder of the next less significant bit subcircuit.

In preferred embodiments a quotient output register receives the carry-out bits of the adders and combines them as plural bits of the N-bit quotient; there are pipeline registers connected between the carry-out outputs of the adders and the inputs to the quotient output register in order to permit repeated, high-speed calulations (e.g., the conversion of RBG data to HSI data); and there is a zero detection circuit for forcing the quotient output to zero when the dividend equals zero.

In a further aspect our invention features in general a floating point divider that divides a digital fixed point dividend signal by a digital fixed point divisor signal by first decoding these two signals to obtain dividend and divisor exponent signals indicating the bit position corresponding to the most significant (left-most) high bit of the input signals, and using the exponent signals to determine the exponent of the quotient and to left-justify the divisor and dividend signals to obtain mantissa signals that are divided by a mantissa divider.

In preferred embodiments there is a mantissa barrel shifter connected to shift the mantissa divider output by one bit if the most significant bit of the mantissa is low; there is an adder connected to subtract one from to the exponent if the most significant bit of the mantissa is low; there are a mantissa correction circuit and an exponent correction circuit connected to correct for special cases; there is a zero detection circuit connected to determine if the divisor exponent is zero; there are feedback circuits connected to repeat the previous values upon receiving a control signal (e.g., a video blanking signal); and a circuit is used to add a value to the exponent to provide a desired range.

Other advantages and features of the invention will be apparent from the following description of the preferred embodiment and from the claims.

DESCRIPTION OF THE PREFERRED EMBODIMENT

The preferred embodiment will now be described.

STRUCTURE

Figure 1:
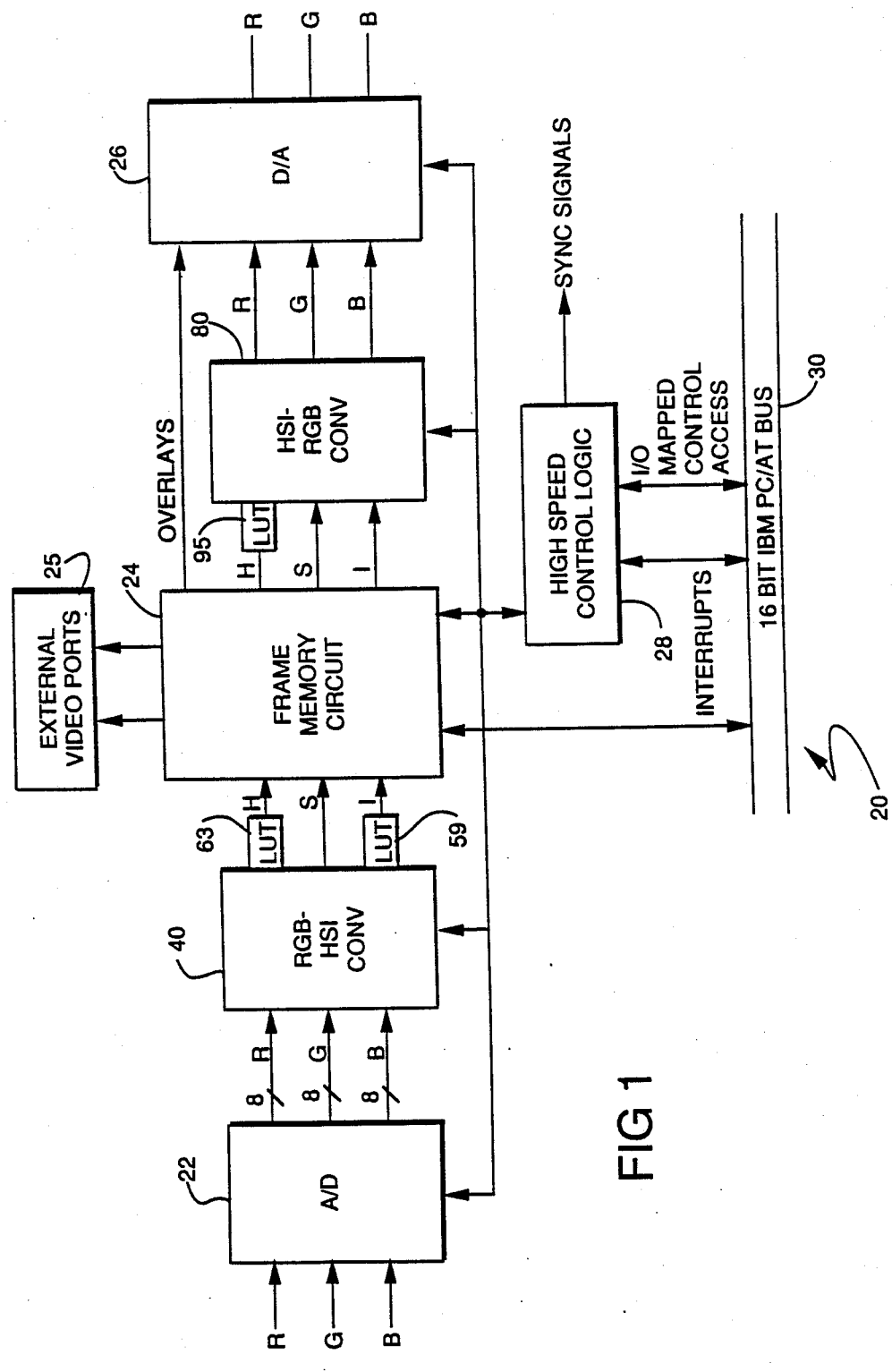
FIG. 1 is a block diagram describing a color video processing system according to the invention.

Referring to FIG. 1, there is shown color video processing system 20, used to process red, green, and blue (RGB) color video input signals and provide RGB outputs, under the control of a host computer, an IBM PC personal computer (only part of which is shown). The RGB video input signals are inputted to analog-to-digital (A/D) conversion circuit 22, which provides three 8-bit RGB digital inputs to RGB/hue, saturation, intensity (HSI) conversion chip 40. RGB/HSI conversion chip 40 and look-up memory tables 59, 63 output three 8-bit signals representing hue (H), saturation (S), and intensity (I), which are inputted to frame memory circuit 24.

Frame memory circuit 24 contains three 512×512 frame buffers, each 8-bits deep (256K bytes). Each color component (hue, saturation, and intensity) is assigned to one of these frame buffers. A fourth 512×512 buffer is provided for overlays and storage of intermediate results from processor boards. These frame buffers are jumper selectable to occupy any of the 16 available 1 Mbyte blocks within the 16 Mbyte of the host computer's memory space. Frame memory circuit 24 is also connected to two 8-bit, asynchronous, external video ports 25.

Frame memory circuit 24 outputs three HSI signals to look-up table memory 95 and HSI/RGB converson chip 80, which outputs three 8-bit RGB signals to digital-to-analog (D/A) conversion circuit 26 D/A conversion circuit 26 outputs analog RGB signals used to display an image on a cathode ray tube display monitor (not shown).

High-speed control logic 28 is connected to control A/D conversion circuit 22, RGB/HSI conversion chip 40, frame memory circuit 24, HSI/RGB conversion chip 80, and D/A conversion circuit 26. High-speed control logic 28 is also connected to communicate with the host computer over 16-bit bus 30, as is frame memory circuit 24.

Figure 2:
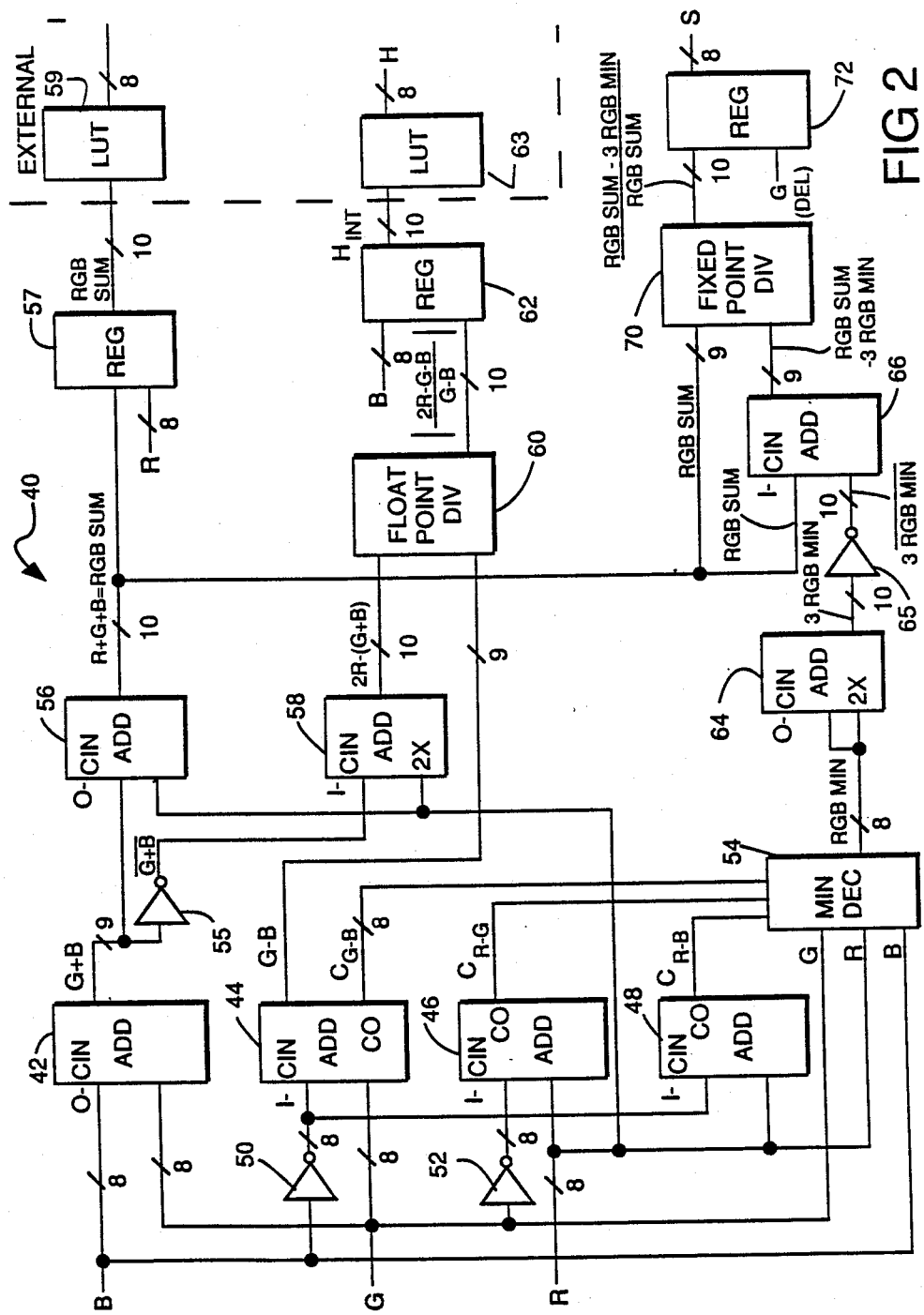
FIG. 2 is a block diagram of an RGB to HSI conversion chip and associated look-up memories of the FIG. 1 system.

Referring to FIG. 2, RGB/HSI conversion chip 40 (an integrated circuit utilizing hardwired components according to complementary metal-oxide-semiconductor (CMOS) technology) is inputted via 8-bit buses with 8-bit parallel digital signals representing red (R), green (G), and blue (B). The signals are inputted to adders 42, 44, 46, and 48. Adder 42 is inputted with the G and B signals. Adder 44 is inputted with the G signal and the complement of B signal outputted by inverter 50. Adders 46 and 48 are inputted with the R signal and the complements of G and B respectively outputted by inverters 52 and 50 respectively. Carry-ins of 1 are also provided to adders 44, 46, and 48 so that they perform 2's complement subtractions of the complement signals inputted to them.

The carry-out bits of adders 44, 46, and 48, $C_{G-B}$, $C_{R-G}$ and $C_{R-B}$, respectively, are inputted to control inputs to minimum decode circuit 54, which is also inputted with the R, G, and B signals. Circuit 54 includes a multiplexer to selectively output one of the R, G, B inputs and logic that causes the multiplexer to output the signal having the minimum value, RGB MIN, identified by decoding the $C_{G-B}$, $C_{R-G}$, and $C_{R-B}$ inputs.

Adder 56 is inputted with the 8-bit R signal and the 9-bit G+B signal outputted from adder 42. Adder 56 outputs the 10-bit signal RGB SUM, which is equal to R+G+B. RGB SUM is inputted into register 57, which synchronizes and outputs the RGB SUM signal used to address look-up table memory 59. Look-up memory 59 stores data that is one-third the value of the address, acting to divide RGB SUM by 3 to obtain the intensity signal (I). Register 57 is also inputted with the 8-bit R signal, permitting it to be directly outputted when in a by-pass mode.

Figure 4:
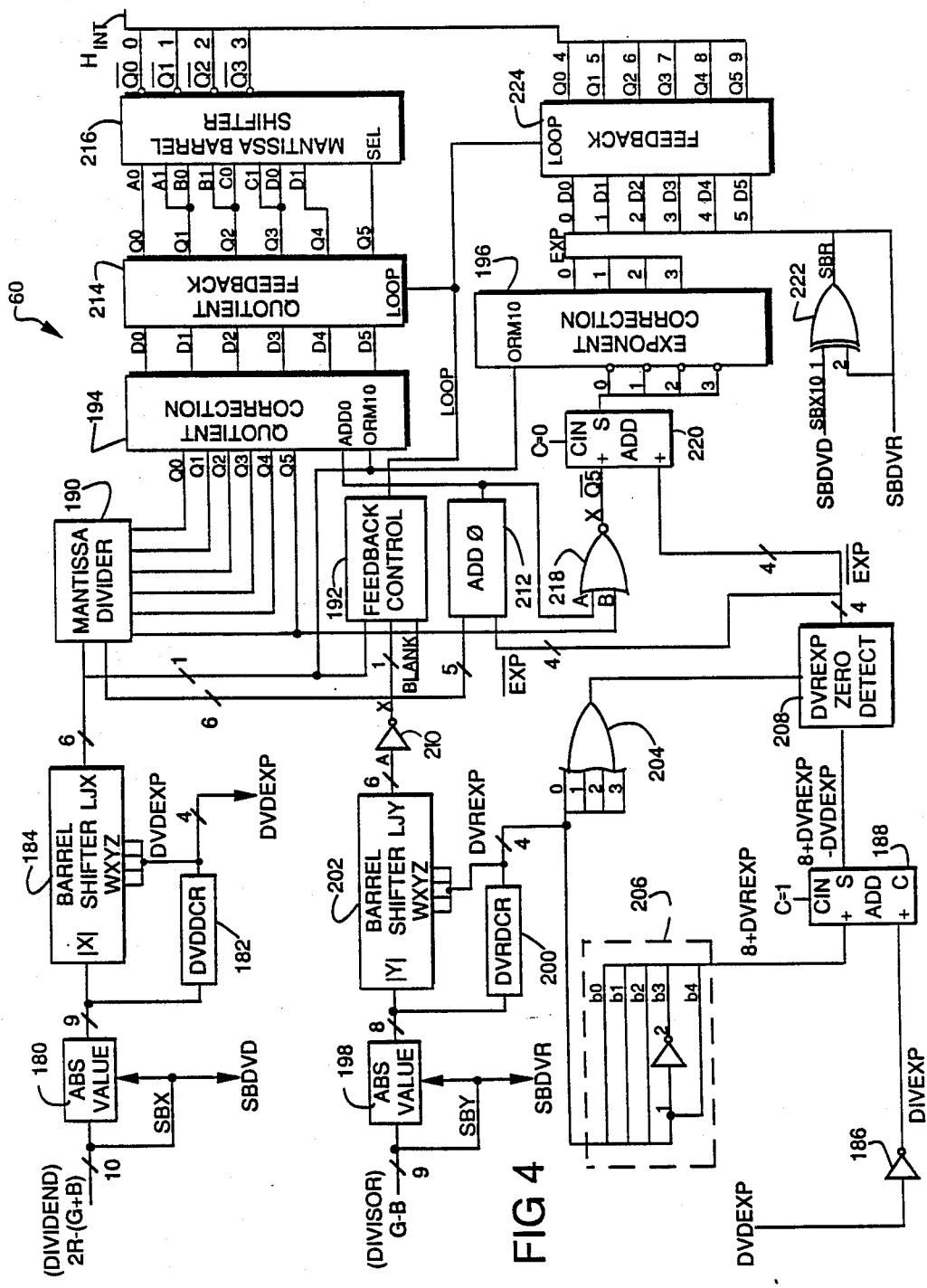
FIG. 4 is a block diagram of a floating point divider used in the FIG. 2 chip.

The G+B output of adder 42 is also inputted into inverter 55, whose output is inputted into adder 58. Adder 58 is also inputted with the 8-bit R-signal, which is shifted one bit relative to the input of adder 58, thereby providing an input equal to twice the actual value. A carry-in of 1 is also provided to perform a 2's complement subtraction of G+B from 2R. The 10-bit output of adder 58, which includes a sign bit, and the 9-bit output of adder 44, which includes a sign bit, are inputted to floating point divider 60 (FIG. 4). The 10-bit output of floating point divider 60, which includes two sign bits, SBQ and SBDVR, is inputted to register 62, which outputs an intermediate output, $H_{INT}$, used to address look-up table memory 63 to obtain the hue signal (H). Register 62 is also inputted with the 8-bit B signal, permitting it to be directly outputted when in the by-pass mode.

The output of a minimum decoder 54 is inputted twice to adder 64, and the bits of one of these inputs are shifted left by one place relative to the bits of the other input, thereby providing an input equal to twice the actual value for the latter input. The output of adder 64, 3×RGB MIN, is inverted by inverter 65, and this inverted signal and the output of adder 56 are inputted to adder 66 along with a carry-in of 1 to perform a 2's complement subtraction of 3 RGB MIN from RGB SUM. The output of adder 56 is inputted, along with the output of adder 66, into fixed point divider 70. The output of fixed point divider 70 is inputted into register 72. The output of register 72 is the saturation signal (S). Register 72 is also inputted with a G signal, permitting it to be directly outputted when in a by-pass mode. Chip 40 also includes a plurality of pipeline registers (not shown) in the signal paths to synchronize the signals in the paths and the I, H and S outputs. The G signal provided to register 72 is delayed one clock period with respect to the R and B inputs provided to registers 57, 62 because of LUT timing delays.

Figure 3:
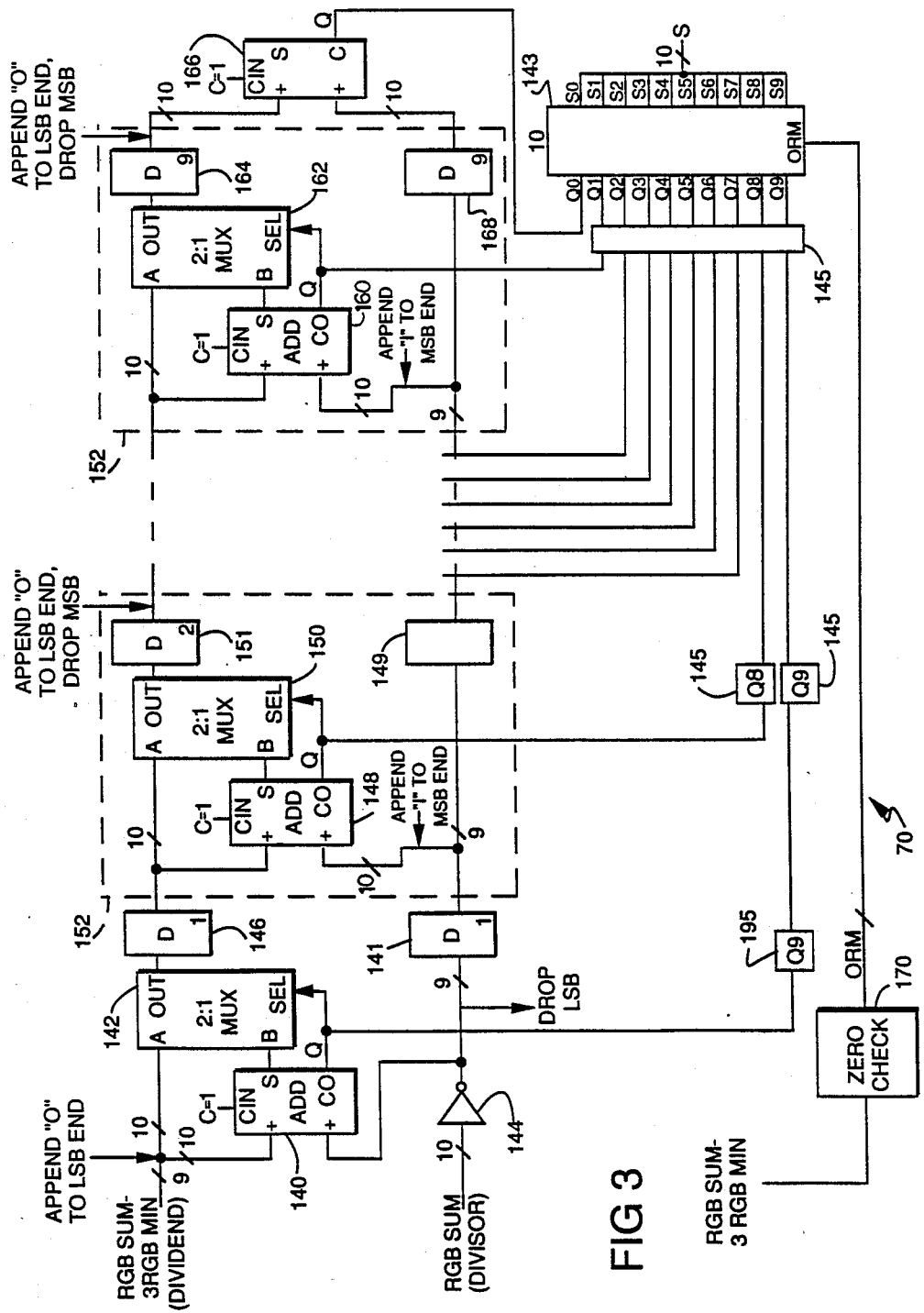
FIG. 3 is a block diagram of a fixed point divider used in the FIG. 2 chip.

Referring to FIG. 3, fixed point divider 70 of chip 40 is inputted with RGB SUM, the 10-bit divisor signal, and RGB SUM−3 RGB MIN signal, the 9-bit dividend signal. The dividend signal is shifted one bit to the left (appending a 0 to the LSB end) to create a 10-bit shifted dividend signal, which is inputted to adder 140 and the A input of multiplexer 142. The divisor signal is inverted by inverter 144 and inputted to adder 140, and the carry-in input of adder 140 is hardwired high, so that adder 140 performs a 2's complement subtraction of the divisor signal from the dividend signal. The sum output S of adder 140 is inputted to the B input of multiplexer 142; the carry-out output C0 is inputted into the select input of multiplexer 142 and the Q9 (most significant bit) input of quotient output register 143 via pipeline registers 145. The output of multiplexer 142 is inputted to register 146. The inverted divisor signal from inverter 144 is shifted to the right, dropping the LSB, and inputted as a 9-bit number to register 141.

Adder 140, multiplexer 142, register 141, and register 146 constitute a bit subcircuit that provides a single bit output of the 10-bit quotient outputted by quotient output register 143. A second bit subcircuit, designated 152, includes adder 148, multiplexer 150, and registers 151 and 149 and provides the second most significant bit (Q8) of the quotient. The output of register 146 is inputted to adder 148 and multiplexer 150. The carry-in input of adder 148 is hardwired high. The output of register 141 has a "1" appended to its most significant bit (MSB) end, and this 10-bit signal is inputted to adder 148 and to register 149. The sum output S of adder 148 is inputted to multiplexer 150. The carry-out output C0 is inputted to the select input of multiplexer 150, and the Q8 input of output register 143. The output of multiplexer 150 is inputted to register 151, the output of which is shifted one bit, appending a "0" to the LSB end and dropping the MSB.

The shifted dividend output of register 151 and the inverted divisor output of register 149 are inputted to the next bit subcircuit 152, which outputs a further bit of the quotient to output register 143 and feeds the next subcircuit 152 (all not shown). The final fixed point divider subcircuit 152 includes adder 160, multiplexer 162, and registers 164, 168, and provides the Q1 input to register 143. The outputs of registers 164 and 168 are inputted into adder 166, the carry-out C0 output of which provides the Q0 input of output register 143. The RGB SUM−3 RGB MIN signal is inputted into zero checking logic 170, the output of which forces the quotient output of register 143 to zero when RGB SUM−3 RGB MIN, the dividend, is zero.

Figure 5:
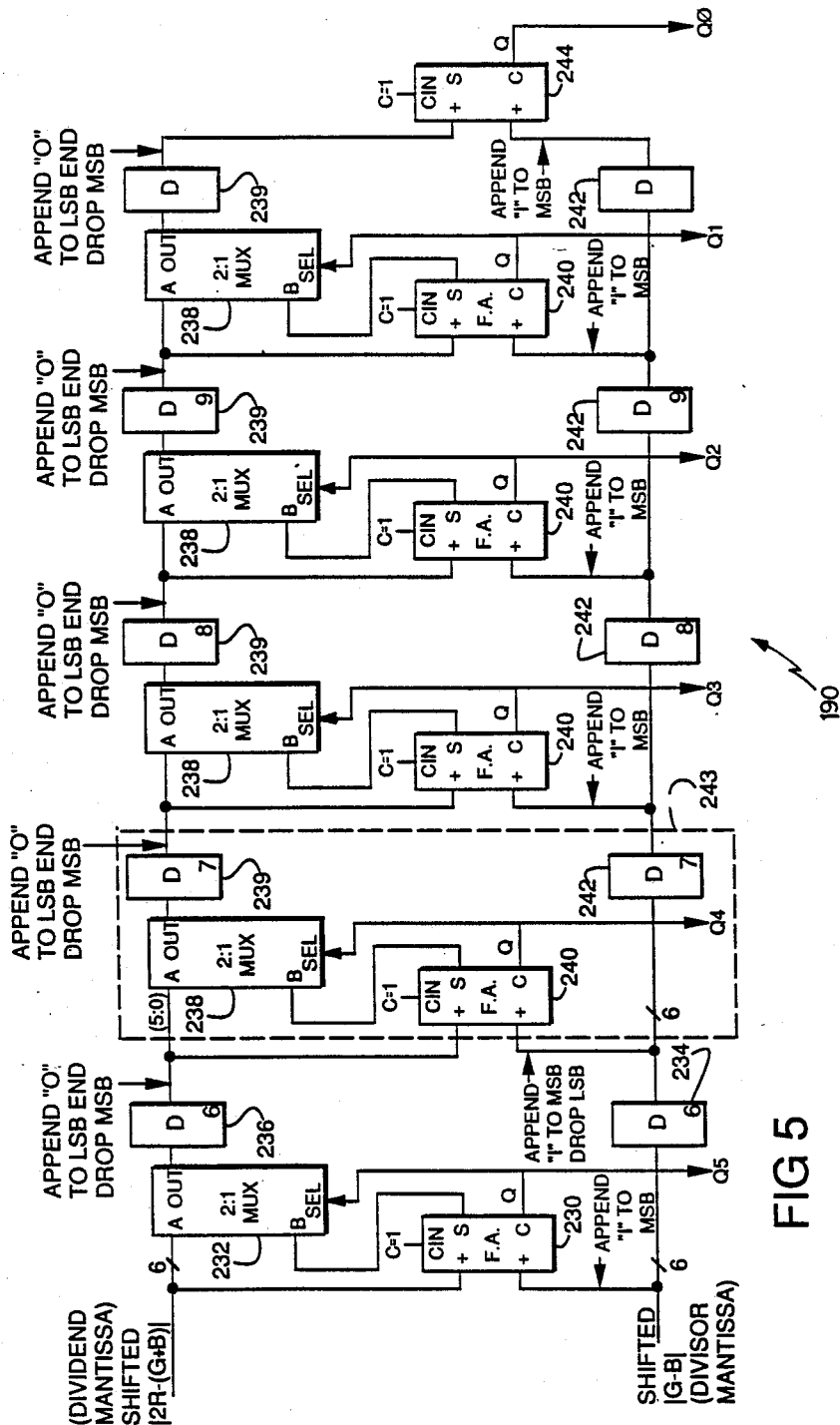
FIG. 5 is a block diagram of a mantissa dividing circuit used in the FIG. 4 floating point divider.

Referring to FIG. 4, floating point divider 60 of chip 40 is inputted with the 10-bit dividend signal 2R−(G+B) and the 9-bit divisor signal G−B; both signals are in 2's complement form and have a sign bit at the MSB position. The dividend signal is inputted to absolute value module 180, which outputs a 9-bit unsigned absolute value dividend signal. The absolute value dividend signal is inputted to dividend decoding circuit 182 and barrel shifter 184. The 4-bit dividend exponent signal, DVDEXP, of dividend decoding circuit 182 indicates the bit location (counting from right to left starting counting with "1") of the left-most "1" in the absolute value dividend signal. If the dividend equals 0, then DVDEXP is set equal to 0. DVDEXP is inputted to control shifting of the absolute value dividend signal at barrel shifter 184 so that the left-most "1" is at the MSB position. The 9-bit dividend mantissa output of barrel shifter 184 drops its three least significant bits (LSBs); the remaining 6-bit dividend mantissa signal is inputted to mantissa division circuit 190 (FIG. 5). The MSB of the output of barrel shifter 184 is inputted to feedback control module 192, quotient correction module 194, and exponent correction module 196.

The 9-bit G−B divisor signal is similarly inputted to absolute value module 198, which outputs an unsigned 8-bit absolute value divisor signal. The absolute value divisor signal is inputted to divisor decoding circuit 200, which outputs DVREXP (indicating the position of the left-most "1" or a "0" if the divisor equals "0"), and barrel shifter 202, which shifts the bits so that the left-most "1" is at the MSB. The output of barrel shifter 202, the divisor mantissa signal, drops its two least significant bits; the remaining 6-bit signal is inverted by inverter 210. This inverted signal is inputted to mantissa division circuit 190 and to "ADD0" module 212. The most significant bit of the output of inverter 210 is inputted to feedback control module 192.

DVDEXP is inputted to inverter 186, the output of which is inputted to adder 188. DVREXP is inputted into OR-gate 204 and add-8 circuit 206. The output of add-8 circuit 206, 8+DVREXP, is inputted to adder 188. The carry-in bit of adder 188 is hardwired high so that DVDEXP is subtracted from 8+DVREXP. The output of adder 188, 8+DVREXP−DVDEXP, and the output of OR-gate 204 are inputted to DVREXP zero detection circuit 208.

Referring to FIG. 5, the 6-bit dividend mantissa signal is inputted to adder 230 and 2:1 multiplexer 232 of mantissa divider 190; the inverted 6-bit divisor mantissa signal is inputted to adder 230 and register 234. The carry-in input of adder 230 is hardwired high to perform 2's complement subtraction of the divisor mantissa signal from the dividend mantissa signal. The sum output S of adder 230 is inputted to multiplexer 232. The carry-out output of adder 230 is inputted to the select input of multiplexer 232 and is outputted as the Q5 output of mantissa divider 190. The output of multiplexer 232 is inputted to register 236.

The output of register 236 is inputted to multiplexer 238 and adder 240. The output of register 234 is inputted to register 242. The output of register 234 also has a "1" appended to its MSB end, its bits shifted right, and the LSB dropped and is then input to adder 240. The sum output S of adder 240 is inputted to multiplexer 238.

The carry-out output of adder 240 is inputted to the select input of multiplexer 238 and is outputted as the Q4 output of mantissa divider 190. The output of multiplexer 238 is inputted to register 239, the output of which is shifted left one bit, appending a "0" to the LSB end, dropping the MSB. The combination of adder 240, multiplexer 238, and registers 239 and 242 constitute a bit subcircuit 243. This subcircuit is repeated for the Q3, Q2, and Q1 outputs of mantissa divider 190. The registers of the subcircuit that outputs Q1 are inputted to adder 244. The carry-out output of adder 244 is outputted as the Q0 output of mantissa divider 190.

Referring again to FIG. 4, the Q5 to Q0 outputs of mantissa divider 190 are inputted to quotient correction module 194. There also are pipeline registers (not shown) on the Q5-Q0 outputs to quotient correction module 194. The outputs of quotient correction module 194 are inputted to quotient feedback module 214. The outputs of quotient feedback module 214 are inputted to barrel shifter 216. Barrel shifter 216 is a 2:1 multiplexer having one set of inputs shifted by one bit. The MSB of feedback module 214, Q5, provides the select control for barrel shifter 216.

Q5, the MSB output of mantissa divider 190, is inputted to NOR-gate 218, along with the output of ADD0 module 212. The output of NOR-gate 218 is inputted to adder 220. The sum output S of adder 220 is inputted to exponent correction module 196.

Sign bits SBDVD and SBDVR are inputted into exclusive OR-gate 222. The output of exclusive OR-gate 222, SBQ, and the SBDVR sign bit are respectively inputted to the D4 and D5 inputs of feedback module 224. The outputs of exponent correction module 196 are inputted to inputs D0–D3 of feedback module 224.

The outputs of mantissa barrel shifter 216 and feedback module 224 are appended to provide a 10-bit signal, which includes 4 bits of mantissa (there is an additional assumed high most significant mantissa bit), 4 bits of exponent, and the two sign bits, SBQ and SBDVR, which determine quadrature.

Figure 6:
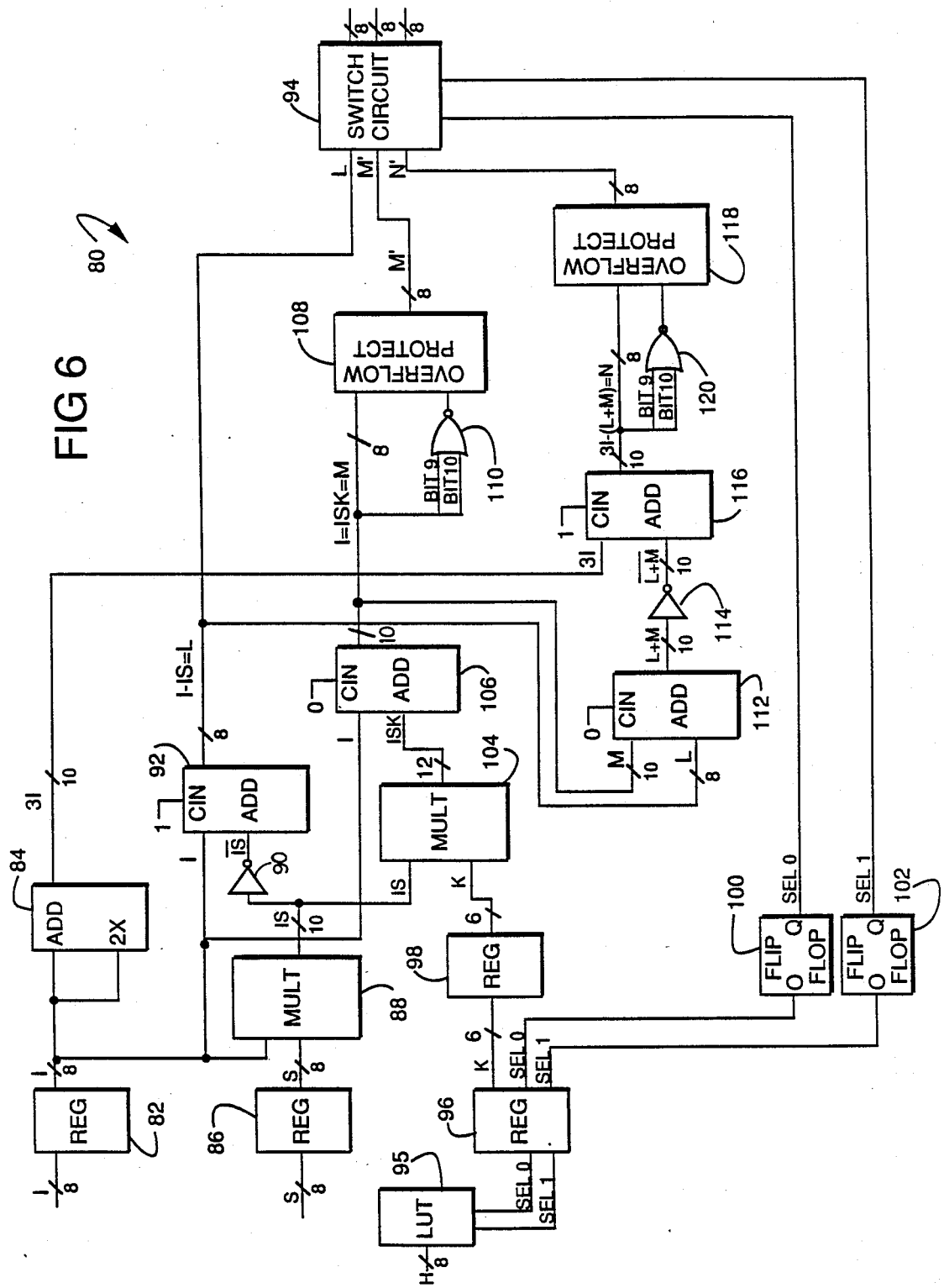
FIG. 6 is a block diagram of an HSI to RGB conversion chip and associated look-up memory of the FIG. 1 system.

Referring to FIG. 6, HSI/RGB conversion circuit 80 (an integrated circuit utilizing hardwired components according to CMOS technology) is inputted with 8-bit H, S, and I signals read from frame memory circuit 24. The I signal is inputted into register 82, which outputs an 8-bit signal to adder 84. Adder 84 is inputted with this signal twice, one input having the bits shifted left one bit, thereby producing an input that is equal to twice its true value; thus the output of adder 84 is 3I, three times the input. The S signal is inputted into register 86, whose output is inputted to two's complement registered multiplier 88. The output of register 82, I, is also inputted into multiplier 88, whose output is IS. Signal IS is inverted by inverter 90 and inputted into adder 92, which is also inputted with the output of register 82, I. The output of adder 92, I−IS=L, is inputted into switching circuit 94. The carry-in input of adder 92 is hardwired high to perform a 2's complement subtraction.

The 8-bit H signal is inputted into look-up memory table 95, which outputs to register 96 the color type data, a 6-bit signal, K, and the color control data, two one-bit signals, SEL0 and SEL1. The K signal is inputted to register 98, and the SEL1 and SEL1 signals are inputted to flip-flops 100 and 102, respectively. The outputs of flip-flops 100 and 102 are inputted into the control inputs of switching circuit 94. As with circuit 40, circuit 80 includes pipeline registers (not shown) to synchronize the signals along the various paths.

The registered K signal from register 98 and the output of multiplier 88, IS, are inputted into two's complement multiplier 104. The outputs of multiplier 104, ISK, and register 82, I, are inputted into adder 106.

The output of adder 106, I+ISK=M, is a 10-bit signal of which the 8 least significant bits are inputted directly to overflow protection circuit 108 and the two MSBs, MBIT 9 and MBIT 10, are inputted into NOR gate 110. The output of NOR gate 110 is inputted into overflow protection circuit 108. Overflow protection circuit 108 outputs 8-bit signal M , which is inputted to switching circuit 94. The outputs of adder 106, M, and adder 92, L, are inputted into adder 112. The output of adder 112 is inverted through inverter 114 and then, along with the output of adder 84, 3I, inputted to adder 116. The output of adder 116, 3I−(L+M)=N, is a 10-bit signal of which the 8 least significant bits are inputted directly to overflow protection circuit 118 and the two most significant bits, NBIT 9 and NBIT 10, are inputted into NOR gate 120. The output of NOR gate 120 is inputted into overflow protection circuit 118. Overflow protection circuit 118 outputs an 8-bit signal, N', which is inputted into switching circuit 94. Switching circuit 94 includes logic to connect each input L, M and N' to one of the three 8-bit signals R, G, and B, depending on the states of the control inputs, SEL0, SEL1. Connected to the R, G, B outputs of switching circuit 94 are three registers (not shown) that have an alternate set of inputs that are directly connected to the outputs of registers 82, 86 and the by-pass output of LUT 95 and can be selected to by-pass the HSI to RGB conversion when in a by-pass mode.

OPERATION

In operation, the three R, G, B input vectors are each separately digitized at A/D conversion circuit 22 into one 8-bit word for each pixel in a 512×512 array that corresponds to a screen. The digital R, G, B signals are converted at RGB/HSI conversion circuit 40 in real time into 8-bit each H, S, I, digital signals stored in respective 512×512 frame buffers of frame memory circuit 24. The H, S, I data can be routed via external ports 25 to be analyzed or modified to achieve desired results. E.g., one might wish to determine dominant colors or detect object edges, and this is easier to do with HSI data than with RGB data. The modified HSI data could be returned to frame memory circuit 24 for reconversion at HSI/RGB conversion circuit 80 into RGB data that are then converted into analog signals at D/A conversion circuit 26 for display on a conventional color CRT.

When in the RGB to HSI conversion mode, RGB/HSI conversion circuit 40 converts signals representing red (R), green (G), and blue (B) to signals representing hue (H), saturation (S), and intensity (I) in real time, employing the following prior art mathematical relationships:

$$I = \frac{R + G + B}{3}$$

$$S = \frac{3I - 3*MIN\ (R,G,B)}{3I}$$

$$H =$$

$$1/360 * \left[ 90 - \left( \text{ARCTAN} \frac{H_{INT}}{\text{SQRT}(3)} \right) + \left\{ \begin{array}{l} 0, G > B \\ 180, B > G \end{array} \right\} \right],$$

$$\text{where } H_{INT} = \frac{2R - G - B}{G - B}$$

Referring to FIG. 2, I is obtained by adding G and B at adder 42, adding R to G+B at adder 56, and obtaining one-third of R+G+B at look-up table 59, which has one-third the address values stored as data.

H is obtained by adding the inverse of G+B from inverter 55 to twice the R signal with a carry-in of 1 at adder 58, thereby producing 2R−(G+B). This signal is divided by G−B from adder 44 at floating point divider 60, which outputs the absolute value of (2R−G−B)/(G−B)=$H_{INT}$ as a 10-bit signal which includes a 4-bit mantissa, a 4-bit exponent and two sign bits, as is discussed in more detail below. $H_{INT}$ is used to address look-up table 63, the data output of which is H. The trigonometric and square root functions in the brackets of the equation for H are thus reflected in the data stored in look-up table 63. The sign bits of $H_{INT}$ determine to quadrature around the color triangle.

S is obtained utilizing the carry-out bits from adders 44, 46, and 48 at minimum decode circuit 54 to determine which signal, R, G, or B, has the minimum value. Minimum decoder circuit 54 then outputs this signal, RGB MIN, to adder 64, which adds RGB MIN to 2 RGB MIN thereby producing 3×RGB MIN. The inverse of this is added to RGB SUM from adder 56 with a carry-in of 1 at adder 66 to produce RGB SUM−3 RGB MIN, which is then divided by RGB SUM at a fixed point divider 70 to produce S, as is discussed in more detail below. S as outputted from register 72 is delayed one clock period with respect to the outputs of registers 57, 62 to compensate for the look-up tables through which signals RGB SUM and $H_{INT}$ must pass.

In the by-pass mode, registers 57, 62, and 72 directly output the R, B, and G signals. The R and B signals are passed through look-up table memories 59, 63, and the G signal provided to register 72 is delayed one'clock period to compensate for the time it takes the R and B signals to pass through the look-up tables.

Referring to FIG. 3, fixed point divider 70 performs long division of RGB SUM−3 RGB MIN by RGB SUM. The long division is performed by a series of two s complement subtractions and bit shifting at bit subcircuits. Because the divisor, RGB SUM, is always greater than or equal to the dividend, RGB SUM—3 RGB MIN, the simple circuit shown in FIG. 3 can be advantageously used to accurately divide these two numbers in a pipelined manner.

More specifically, in the first bit subcircuit, one-half of the divisor is in effect subtracted from the dividend at adder 140. Because the divisor is inverted, and the carry-in input of adder 140 is pulled high, a 2's complement subtraction occurs. A "0" is added to the LSB end of the 9-bit dividend, and the other bits are shifted to the left to provide a 10-bit number; this shifting to the left by one bit with respect to the divisor in effect causes one-half of the divisor to be subtracted from the dividend. The carry-out bit of adder 140 is Q9, the MSB of the quotient, and the select control for multiplexer 142. If the carry-out bit equals "0", the dividend signal (input A) is passed through by multiplexer 142; if the carry-out bit equals "1", the sum from adder 140 (input B) is passed through by multiplexer 142. The output of multiplexer 142, referred to as a dividend signal even though it might be the sum output of the adder, is added at adder 148 of the second bit subcircuit to the inverted divisor signal. Prior to adding, the inverted divisor signal s LSB is dropped, the bits are shifted right, and a "1" is appended to the MSB end of the inverted divisor signal. Placing a "1" at the MSB of the inverse of the divisor provides a 10-bit number without changing the value.

The shifting of the divisor to the right at this subcircuit and of the dividend to the left at the prior subcircuit in effect causes one-fourth of the divisor to be subtracted (2's complement) from the dividend at adder 148. The carry-out output of adder 148 is Q8, the second MSB of the quotient, and provides the select control for multiplexer 150. Once again, if the carry-out bit equals "0", then the shifted dividend signal is passed through by multiplexer 150; if the carry-out bit equals "1", then the sum output of adder 148 is passed through by multiplexer 150. The output of multiplexer 150, the dividend signal, has a "0" appended to its LSB end, its bits shifted left and its MSB dropped. Dropping the MSB does not affect the value of the dividend signal, because the MSB is always "0", owing to control of multiplexer 150 by the carry-out of adder 148. (E.g., if the carry-out is "1", then the MSB of the S output is "0", and if the carry-out is "0", the MSB of the shifted dividend signal is "0".)

The subtracting, selecting, and shifting is carried out in bit subcircuits 152 for each bit of the quotient. There is a final subtraction at adder 166, the carry-out bit of which is Q0, the least significant bit of the quotient. The quotient bits are pipelined by registers 145 so that they all arrive at quotient output register 143 at the same time. In effect a new quotient for a new pixel of video data is outputted at each clock, permitting high-speed conversion of RGB data to HSI data. The 10-bit output ranges from 0 to 0.9990235 in 0.0009765 increments. A special case exists when RGB SUM−3 RGB MIN equals 0. In this case zero checker 170 outputs a 0, and this forces the output of register circuit 144 to zero.

Referring to FIG. 4, floating point divider 60 is inputted with 2R−(G+B), the 10-bit dividend signal, and G - B, the 9-bit divisor signal, both of which are in 2's complement form and include sign bits. The dividend signal and divisor signal are first decoded to obtain DVDEXP and DVREXP exponent signals indicating the position of the most significant (left-most) high bit. DVDEXP and DVREXP are then used to determine the exponent of the quotient and to left-justify the dividend and divisor signals to obtain mantissa signals that are divided at mantissa divider 190 to obtain the mantissa of the quotient.

More specifically, the dividend signal is inputted to absolute value module 180, which passes through positive signals unchanged and outputs the two's complement of the negative signals. Absolute value module 198 performs the same operation on the divisor signal. The signals outputted from absolute value modules 180 and 198 are inputted to decoding circuits 182 and 200, respectively, which output 4-bit DVDEXP and DVREXP signals indicating the most significant bit position corresponding to the left-most bits of the dividend and divisor signals. DVDEXP or DVREXP are assigned zero if the dividend or divisor are zero. DVDEXP and DVREXP are used by barrel shifters 184 and 202 to shift the respective signals to the left to provide the 6-bit mantissa signals that are divided at mantissa divider 190. The least significant bits are dropped, because they do not significantly affect the accuracy of the 5 bits of mantissa in the quotient, and this results in a significant reduction in hardware.

The exponent signal of the divisor, DVREXP, is inputted to OR-gate 204 in order to determine whether the signal equals 0. An output of 0 from OR-gate 204 indicates to DVREXP zero detection circuit 208 that DVREXP equals zero, and therefore the divisor is equal to zero. In this case zero detection circuit 208 will then set the exponent of the quotient to its maximum amount. Eight is added to DVREXP by add-8 circuit 206 to produce the signal 8+DVREXP. The inverse of DVDEXP is added to the 8+DVREXP at adder 188 to produce 8++DVREXP−DVDEXP, which equals the inverse of EXP, the signal that is outputted from zero detection circuit 208 and is used to determine the exponent of the output of the floating point divider. The exponents, which range from −8 to +7, provide desired range for quotients, namely 0.0078125 to 496. Eight is added to shift the range in binary for a minimum (at 0000) corresponding to −8 and a maximum (at 1111) corresponding to +7.

Mantissa division circuit 190 receives the 6-bit dividend signal from barrel shifter 184 and the inverted 6-bit divisor signal from inverter 210, which receives the signal from barrel shifter 202. Referring to FIG. 5, mantissa division circuit 190 functions in much the same way as fixed point divider 70, except the dividend can be greater than the divisor, and the first stage is subtraction of the divisor instead of the divisor/2. E.g., the two signals being divided are in effect subtracted in 2's complement form at adder 230, and the carry-out bit of adder 230 becomes the most significant bit of the quotient output and the control for multiplexer 232. The output of multiplexer 232 has a "0" appended to its LSB end and drops its MSB, and this signal serves as one input for adder 240. The other input of adder 240 is the inverted divisor signal with its LSB dropped and a "1" appended to its MSB. The outputs Q5-Q0 of mantissa divider circuit 190 are used by barrel shifter 216 to form the mantissa portion of the outputted signal.

Returning to FIG. 4, the sign bits of the dividend and divisor, SBDVD and SBDVR, are exclusive-ORed by exclusive OR-gate 222 to provide SBQ, the sign bit of the quotient. Barrel shifter 216 is used to assure that the most significant bit of the mantissa is a 1. If there is a 0 on the select input, indicating a 0 in the most significant bit of the mantissa, then the mantissa is shifted left one bit. This shift is compensated for in the exponent by decreasing the exponent by 1. Q5 is inputted to NOR-gate 218. A 0 from Q5, in addition to an 0 from ADD0 module 212, causes NOR-gate 218 to input a 1 to adder 220. Adder 220 would thus add 1 to the inverse of EXP, thus decreasing the exponent by 1. The output of adder 220 is the inverse of the outputted exponent and is inverted at exponent correction 196 to provide EXP, unless a special case exists. Floating point divider 60 outputs a 10-bit signal, which includes a 4-bit mantissa from barrel shifter 216 and a 4-bit exponent and two sign bits from feedback circuit 224. The 4-bit mantissa output functions as a 5-bit mantissa with its most significant bit, which is assumed to always be 1, dropped.

One special case arises when the dividend mantissa signal outputted from barrel shifter 184 equals 0. In this situation, ORM, the most significant bit of the outputted signal of barrel shifter 184, is equal to zero, and quotient correction circuit 194 then forces the mantissa, Q5-Q0, equal to 000000.

A further special case arises when the signal outputted from barrel shifter 184 is 100000, the signal outputted from barrel shifter 202 is greater than 100000, and the inverse of EXP equals 1111. Under these conditions ADD0 module 212 sets its output equal to 1, causing quotient correction module 194 to force Q5-Q0 to 100000 and exponent correction module 196 to force EXP to 0000 to output a minimum value.

Another special case arises from the video convention that, if R=G=B, then the hue is set equal to the previous hue value. This is done by providing a LOOP=1 signal from feedback control module 192 to quotient feedback module 214 and feedback module 224. If R=G=B, the dividend and divisor inputs to divider 60, and thus the MSBs of the mantissas from barrel shifters 184, 202 provided to feedback control circuit 192, are equal to zero. If LOOP equals 1, then quotient feedback module 214 repeats the quotient for the last pixel, and feedback module 224 repeats the exponent and sign bits for the last pixel. However, a problem arises for a left-most pixel on the screen, because the previous stored values in this case relate to the "blanking" video function, which occurs between consecutive horizontal sweeps of pixel data across the screen. During blanking, invalid pixel data are pipelined through chip 40. To accommodate the possibility of the left-most pixel on the screen having R=G=B, the last valid pixel data (at the right-most position of the screen during the previous horizontal sweep) are continually fed back during blanking and are available to be assigned to the left-most pixel. This is done by setting LOOP equal to 1 when "blank" equals 1.

To display the image represented by the HSI data stored in frame memory circuit 24, HSI/RGB conversion circuit 80 converts signals representing hue (H), saturation (S), and intensity (I) to signals representing red (R), green (G), and blue (B) in real time employing the following prior art mathematical relationships:

$$L = I - I^*S$$

$$M = I + I^*S^*K$$

$$N = 3I - L - M$$

where: L, M, and N are intermediates related to R, G, B according to the following relationships:

$L \rightarrow$ minimum color (MIN), determined by SEL0 and SEL1
$M \rightarrow$ color 120 degrees counterclockwise from $L$
$N \rightarrow$ color 120 degrees counterclockwise from $M$
and $K$, SEL0, SEL1, and MIN are determined as follows:

If $0 < 360^*H < 120$, then $K = \dfrac{\cos(360^*H)}{\cos(60 - 360^*H)}$, and $SEL1 = 0$, $SEL0 = 0$, $MIN = B$.

If $120 < 360^*H < 240$, then $K = \dfrac{\cos(360^*H - 120)}{\cos(60 - 360^*H + 120)}$, and $SEL1 = 0$, $SEL0 = 1$, $MIN = R$.

If $240 < 360^*H < 360$, then $K = \dfrac{\cos(360^*H - 240)}{\cos(60 - 360^*H + 240)}$, and $SEL1 = 1$, $SEL0 = 1$, $MIN = G$.

Figure 7:
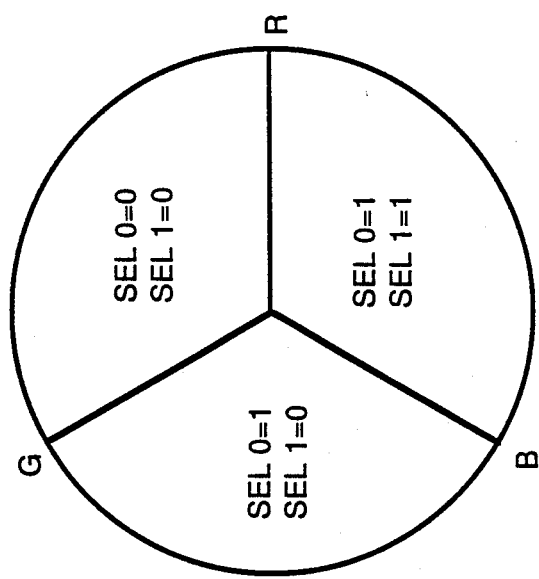
FIG. 7 is a color triangle diagram showing color control signals used in the FIG. 6 chip.

FIG. 7 shows the relationship of the color control data, SEL0 and SEL1, to the RGB output of switching circuit 94. The minimum color is the R, G, or B signal that has the minimum pixel value; thus, it is the primary color which is located opposite the trisector in which the angle equal to 360×hue is located.

Referring to FIG. 6, L is obtained by multiplying I times S at multiplier 88, inverting the resulting product at gate 90, and adding this to I at adder 92, thereby obtaining I−IS=L.

M' is produced utilizing the I, S, and H signals. Look-up table 95 is addressed by H to produce the 6-bit K signal and the control signals SEL0 and SEL1. K is multiplied times IS at multiplier 104, and the output of multiplier 104, ISK, is added to I at adder 106 to produce M. Only eight bits of M are outputted as M. If either of the two most significant bits of M, MBIT 9 and MBIT 10 are high (therefore active), then NOR gate 110 signals overflow protection circuit 108 to set all eight bits of M' to one, so that M' equals 255 (its highest possible value); otherwise the eight least significant bits are passed through circuit 108.

N' is obtained by adding L and M at adder 112, inverting the resulting sum at inverter 114, and performing a 2's complement subtraction of this from 3I, obtained from adder 84, at adder 116. The 10-bit output of adder 116, 3I−(L+M)=N, is reduced to an 8-bit signal by overflow protection circuit 118. If either or both NBIT 9 or NBIT 10 are high, NOR gate 120 signals overflow protection circuit 118 to set N'=255 (its highest possible value); otherwise the 8 least significant bits are passed through. The signal N is inputted to switching circuit 94.

L, M', N' are passed through switching circuit 94 and are each outputted as one of the R, G, and B outputs depending on the states of the SEL0 and SEL1 control signals from flip-flops 100, 102.

OTHER EMBODIMENTS

Other embodiments of the invention are within the scope of the following claims.

Figure 8:
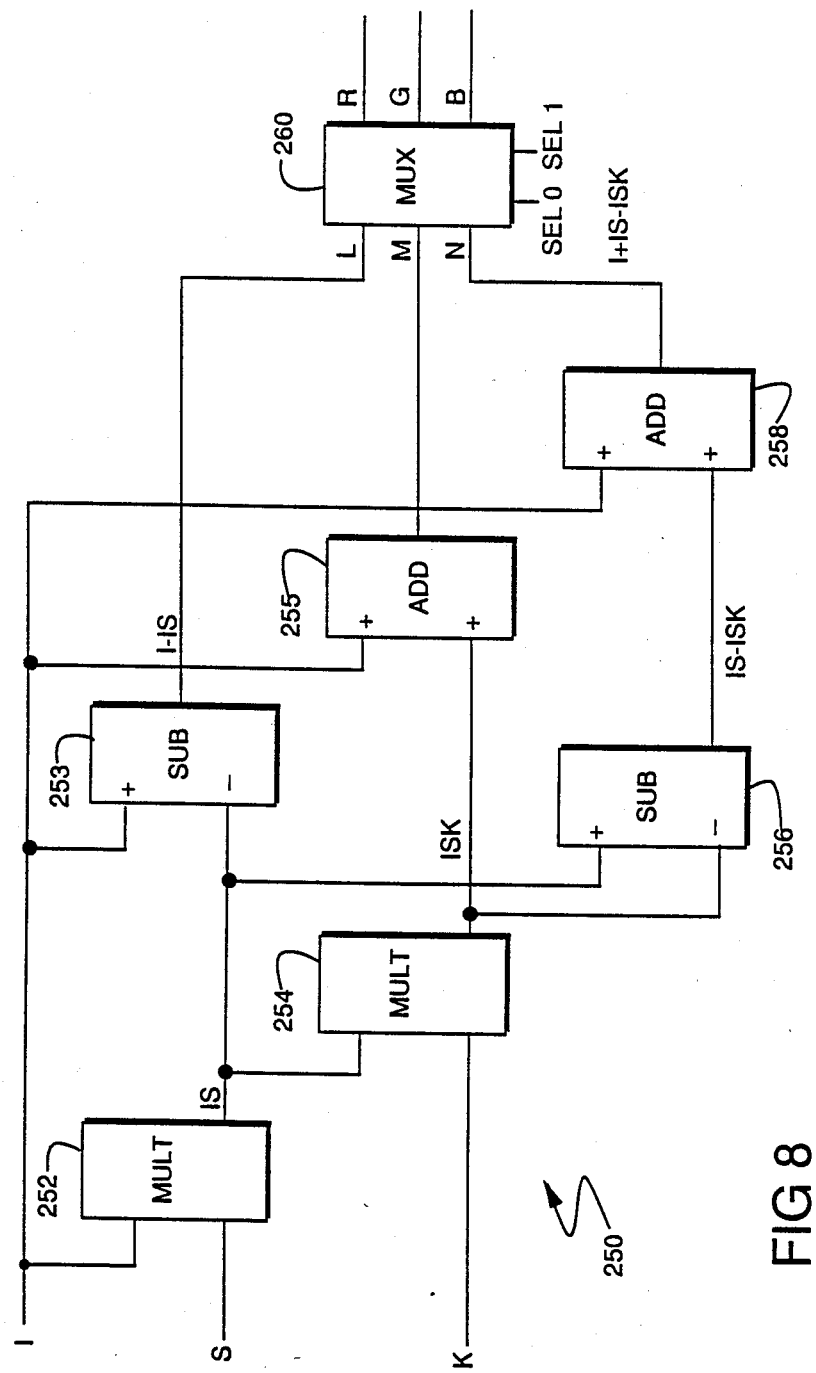
FIG. 8 is a block diagram of an alternative HSI to RGB conversion chip of the FIG. 1 system.

E.g., referring to FIG. 8, alternate HSI/RGB conversion circuit 250 produces the signal $N=I+IS-ISK$ instead of the signal $N=3I-(L+M)$. The L and M signals are produced in the same way as in HSI/RGB conversion circuit 80, using multipliers 252, 254, subtracter 253, and adder 255. The N signal is produced by multiplying I and S with multiplier 252 to produce the signal IS. The IS signal is multiplied with the K signal by multiplier 254. The ISK signal is subtracted from the IS signal by subtracter 256 to produce an IS−ISK signal. The IS−ISK signal is added to the I signal by adder 258. The signal outputted from adder 258, I+IS−ISK equals N, is inputted to switching circuit 260. Switching circuit 260 is controlled by control inputs SEL1 and SEL0 in the same way as switching circuit 94.

Figure 9:
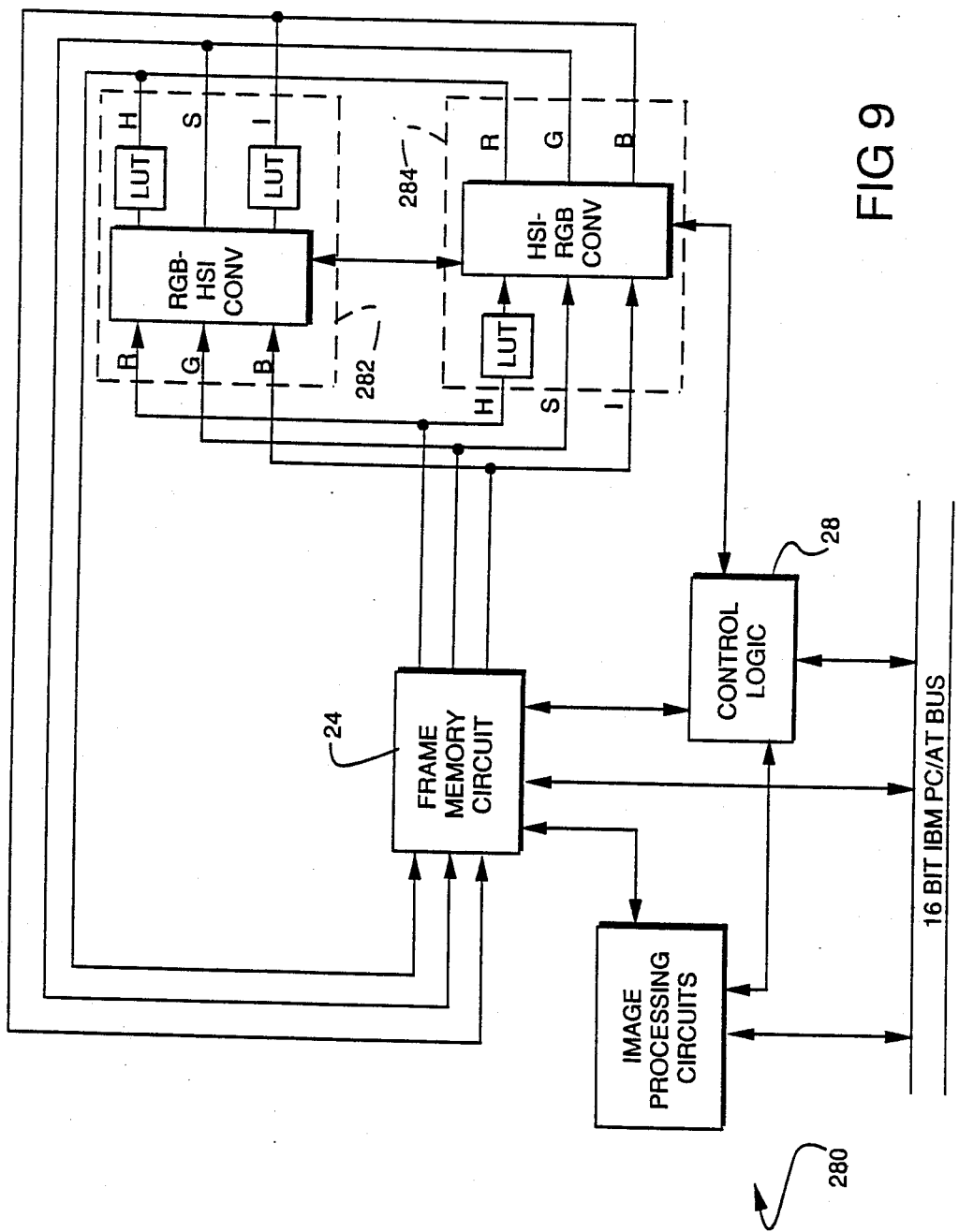
FIG. 9 is a block diagram of an alternative color video processing system.

Also, referring to FIG. 9, alternative video processing system 280 provides feedback options to allow multiple RGB or HSI digital processes on a single frame. In system 280, the outputs of frame memory circuit 24 are inputted to both RGB/HSI conversion circuit 282 and HSI/RGB conversion circuit 284. The outputs of RGB/HSI conversion circuit 282 and HSI/RGB conversion circuit 284 are fed back to the input of frame memory circuit 24. Conversion circuits 282, 284 may be individually selected by control logic 28 depending on the processing requirements of a particular frame. In this way, either RGB or HSI data can be stored in frame memory circuit 24 and, regardless of which has been stored, the RGB or HSI data can be converted to the other.

What is claimed is:

1. Circuitry for converting digital red, green, blue (RGB) inputs into digital saturation and hue outputs comprising
  hardwired digital components connected to receive said digital RGB inputs and to perform arithmetic manipulations of them so as to provide a digital saturation output representing saturation for said RGB inputs and to provide a digital first intermediate output, and
  a first look-up memory storing digital hue data representing hue of said digital RGB inputs at addresses corresponding to values of said digital first intermediate output, said look-up memory being connected to said hardwired digital components to be addressed by said digital intermediate output, said memory providing a digital hue output.

2. The circuitry of claim 1 wherein said hardwired components also provide a digital intensity output.

3. The circuitry of claim 2 wherein said hardwired digital components comprise adders connected to add said digital RGB inputs to provide an RGB SUM output used to provide said digital intensity output.

4. The circuitry of claim 3 further comprising a second look-up memory storing digital data equal in magnitude to one-third the value of the address, said look-up memory connected to be addressed by said RGB SUM output.

5. The circuitry of claim 1 wherein said digital hue data stored in said look-up memory are related to said corresponding first intermediate output by trigonometric functions.

6. The circuitry of claim 1 wherein said hardwired digital components comprise adders connected to add said digital RGB inputs to provide an RGB SUM output.

7. The circuitry of claim 6 wherein said hardwired digital components further comprise a minimum decode circuit that is connected to receive the digital RGB inputs and provides the smallest of said RGB inputs as an RGB MIN output.

8. The circuitry of claim 7 wherein said hardwired digital components further comprise adders that are connected to subtract different combinations of said digital RGB inputs and have carry-out information, and said minimum decode circuit utilizes said carry-out information from said adders to determine the smallest of the RGB inputs.

9. The circuitry of claim 7 wherein said hardwired digital components further comprise a saturation adding circuit which takes said RGB MIN output, adds it to a signal which is twice said RGB MIN output, thereby producing a 3 RGB MIN signal, and then subtracts said 3 RGB MIN from said RGB SUM output, thereby producing an RGB SUM—3 RGB MIN signal.

10. The circuitry of claim 9 wherein said saturation adding circuit utilizes an inverter and an adder to perform said subtraction in 2's complement form.

11. The circuitry of claim 9 wherein said hardwired digital components further comprise a fixed point hardwired divider circuit, said divider circuit dividing said RGB SUM—3 RGB MIN signal by said RGB SUM quotient output, said digital saturation output comprising said quotient output.

12. The circuitry of claim 11 wherein said fixed point hardwired divider circuit comprises bit subcircuits that each provide a single bit output of an N-bit quotient output provided to another said hardwired component, each said subcircuit being connected to receive, except for the most significant subcircuit, a more significant dividend signal and a more significant divisor signal from a more significant subcircuit and to output a dividend signal and a divisor signal to a less significant subcircuit.

13. The circuitry of claim 6 wherein said adders comprise an adder providing a G+B signal, and said hardwired digital components comprise a subtracter connected to subtract said G+B signal from a signal which is twice said R signal to provide a 2R−G−B signal.

14. The circuitry of claim 9 or 13 wherein the signal inputted to a said hardwired component connected to produce said signal which is twice another signal is a multibit signal that is shifted one bit relative to another input of said hardwired component.

15. The circuitry of claim 13 wherein said subtracter comprises an inverter and an adder connected to perform subtraction in 2's complement form.

16. The circuitry of claim 13 wherein said hardwired digital components further comprise a floating point divider to divide said 2R−G−B signal by a G−B signal and to produce a signal which includes the absolute value of (2R−G−B)/(G−B), said signal being said digital first intermediate output.

17. The circuitry of claim 16 wherein said digital first intermediate output also includes sign bits.

18. The circuitry of claim 16 wherein said floating pointer divider receives said 2R-G-B signal as a dividend signal and said G-B signal as a divisor signal, said floating point divider comprising
  a dividend decoding circuit connected to receive said dividend signal and output a dividend exponent signal indicating the most significant bit position corresponding to the left-most high bit of said dividend signal,
  a divisor decoding circuit connected to receive said divisor signal and output a divisor exponent signal indicating the most significant bit position corresponding to the left-most high bit of said divisor signal,
  a dividend shifting circuit connected to receive said dividend signal and output a dividend mantissa signal such that said left-most high bit of said dividend signal is the left-most bit of said dividend mantissa signal,
  a divisor shifting circuit connected to receive said divisor signal and output a divisor mantissa signal such that said left-most high bit of said divisor signal is the left-most bit of said divisor mantissa signal,
  a subtraction circuit which subtracts said divisor exponent signal from said dividend exponent signal and provides a quotient exponent signal, and
  a mantissa division circuit which divides said dividend mantissa signal by said divisor mantissa signal and provides a quotient mantissa signal.

19. The circuitry of claim 6 further comprising a second look-up memory storing digital data equal in magnitude to one-third the value of the address, said second look-up memory being connected to be addressed by said RGB SUM output, and wherein said digital first intermediate output is timed to output to said first look-up memory at the same time that said RGB SUM output is timed to output to said second look-up memory.

20. The circuitry of claim 1 wherein said digital saturation output is delayed with respect to said first intermediate output to compensate for the time required for said first look-up memory to be addressed by said first intermediate output.

21. The circuitry of claim 1 further comprising analog-to-digital converters to digitize RGB video signals and provide said digital RGB inputs.

22. The circuitry of claim 1 wherein said hardwired digital components further comprise an N-bit fixed point divider connected to be input with a dividend signal and a divisor signal from other said hardwired components, said divider comprising bit subcircuits that each provide a single bit output of an N-bit quotient output provided to another said hardwired component, each said subcircuit being connected to receive, except for the most significant subcircuit, a more significant dividend signal and a more significant divisor signal from a more significant subcircuit and to output a dividend signal and a divisor signal to a less significant subcircuit.

23. The circuitry of claim 22 wherein each said bit subcircuit comprises
  an adder configured to subtract said more significant divisor signal from said more significant dividend signal and to output a sum signal and a carry-out bit, said carry-out bit being said single bit output of said N-bit quotient output,
  a multiplexer connected to receive said sum signal and said more significant dividend signal as data inputs and to receive said carry-out bit as a control signal to output one of said data inputs as a data output depending on the state of said carry-out bit, and
  shifting means for passing on said data output as a dividend signal to the next less significant bit subcircuit with said divisor signal, said data output being shifted by one bit to the left with respect to said divisor signal.

24. The circuitry of claim 1 wherein said hardwired digital components further comprise a floating point divider connected to be input with a dividend signal and a divisor signal from other said hardwired components, said divider comprising
  a dividend decoding circuit connected to receive said dividend signal and output a dividend exponent signal indicating the most significant bit position corresponding to the left-most high bit of said dividend signal,
  a divisor decoding circuit connected to receive said divisor signal and output a divisor exponent signal indicating the most significant bit position corresponding to the left-most high bit of said divisor signal,
  a dividend shifting circuit connected to receive said dividend signal and output a dividend mantissa signal such that said left-most high bit of said dividend signal is the left-most bit of said dividend mantissa signal,
  a divisor shifting circuit connected to receive such that said left-most high bit of said divisor signal is the left-most bit of said divisor mantissa signal,
  a subtraction circuit which subtracts said divisor exponent signal from said dividend exponent signal and provides a quotient exponent signal, and
  a mantissa division circuit which divides said dividend mantissa signal by said divisor mantissa signal and provides a quotient mantissa signal.

25. The circuitry of claim 1 wherein said hardwired digital components further comprise
a feedback control module connected to receive a video blanking signal and including logic to output a loop control signal when said video blanking signal is asserted, and
a feedback module that is connected to receive a current signal from other said hardwired digital components and said loop control signal, said feedback module outputting as its output a previous signal when said loop control signal is asserted and said current signal when said loop control signal is not asserted.

26. Circuitry for converting digital hue data input (H), saturation data input (S), and data input related to the relative brightness of a signal into digital red, green, blue (RGB) outputs comprising
a look-up memory storing digital intermediate data at addresses corresponding to values of said hue data, said memory providing an intermediate data output when addressed by said hue data, and
hardwired digital components connected to receive said saturation data input (S) and said intermediate data output and to perform arithmetic manipulations of them so as to provide digital RGB outputs.

27. The circuitry of claim 26 wherein said digital second intermediate data output of said second look-up memory includes a color type data (K) output and color control data output, and said color type data output is related to said corresponding hue data by trigonometric functions.

28. The circuitry of claim 27 wherein said color type data output equals:

$$\frac{\cos(360*H)}{\cos(60 - 360*H)}$$

if $0 < 360*H < 120$.

29. The circuitry of claim 27 wherein said color type data output equals:

$$\frac{\cos(360*H - 120)}{\cos(60 - 360*H + 120)}$$

if $120 < 360*H < 240$.

30. The circuitry of claim 21 wherein said color type data output equals:

$$\frac{\cos(360*H - 240)}{\cos(60 - 360*H + 240)}$$

if $240 < 360*H < 360$.

31. The circuitry of claim 27 wherein in said hardwired digital components said digital RGB outputs are first converted into first (L), second (M), and third (N) intermediate color data signals, and wherein said hardwired digital components comprise a switching circuit that selectively connects said first, second, and third intermediate color data signals to said digital RGB outputs utilizing said color control data output, and wherein said data input related to the relative brightness of a signal includes an intensity data input (I).

32. The circuitry of claim 31 wherein said hard-wired digital components comprise a multiplier connected to multiply said intensity data input times said saturation data input to provide a first multiplied output equal to IS.

33. The circuitry of claim 32 wherein said hard wired digital components further comprise subtracters to subtract said first multiplied output from said intensity data input to provide said first intermediate color data signal (I−IS=L).

34. The circuitry of claim 33 wherein said hard-wired digital components comprise multipliers connected to multiply said color type data output (K) by said first multiplied output (IS) to provide a second multiplied output equal to ISK.

35. The circuitry of claim 34 wherein said hard-wired digital components further comprise adders connected to add said second multiplied output (ISK) and said intensity data input to provide said second intermediate color data signal (I+ISK=M).

36. The circuitry of claim 35 wherein said hard-wired digital components further comprise adders connected to add said intensity data input to provide a 3× to intensity data output (3I).

37. The circuitry of claim 36 wherein said hard-wired digital components further comprise adders connected to add said first intermediate color data signal (L) and said second intermediate color data signal (M) to provide a first plus second intermediate color data output (L+M).

38. The circuitry of claim 37 wherein said hardwired digital components further include subtracters connected to subtract said first plus second intermediate color data output from said 3× intensity data output to provide said third intermediate color data signal (3I−L−M=N).

39. The circuitry of claim 35 wherein said hardwired digital components further include subtracters to subtract said second multiplied output from said first multiplied output to provide a first minus second multiplied output equal to IS−ISK.

40. The circuitry of claim 39 wherein said hardwired digital components further include adders to add said intensity data input and said first minus second multiplied output to provide said third intermediate color data signal (IS−ISK=N).

41. The circuitry of claim 31 wherein said color control data determines which of said RGB outputs is a minimum color output.

42. The circuitry of claim 41 wherein said switching circuitry includes logic to connect
said first intermediate color data signal to said minimum color output,
said second intermediate color data signal to the output for the R, G, or B color that is 120° counterclockwise from the color of the minimum color output, and
said third intermediate color data signal to the output for the R, G, or B color that is 240° counterclockwise from the color of the minimum color output.

43. The circuitry of claim 42 wherein said minimum color output is blue if $0 < 360*H < 120$.

44. The circuitry of claim 43 wherein said minimum color output is red if $120 < 360*H < 240$.

45. The circuitry of claim 43 or 44 wherein said minimum color output is green if $240 < 360*H < 360$.

46. The circuitry of claim 26 further comprising digital-to-analog converters connected to receive said digital RGB outputs and provide RGB video signals.

47. An N-bit fixed point divider for dividing a dividend signal input to it by a divisor signal input to it, the divider comprising bit subcircuits that each provide a single bit output of an N-bit quotient output and, except for the most significant subcircuit, receive a more significant dividend signal and a more significant divisor signal from a more significant subcircuit and output a dividend signal and a divisor signal to a less significant subcircuit, each bit subcircuit comprising an adder configured to subtract said more significant divisor signal from said more significant dividend signal and to output a sum signal and a carry-out bit, said carry-out bit being said single bit output of said N-bit quotient output, a multiplexer connected to receive said sum signal and said more significant dividend signal as data inputs and to receive said carry-out bit as a control signal to output one of said data inputs as a data output depending on the state of said carry-out bit, and shifting means for passing on said data output as a dividend signal to the next less significant bit subcircuit with said divisor signal, said data output being shifted by one bit to the left with respect to said divisor signal.

48. The fixed point divider of claim 47 further comprising an inverter that is connected to receive said divisor signal and to provide an inverted divisor output to said adder, and wherein said adder is wired to have a "1" carry-in bit to perform 2's complement subtraction.

49. The fixed point divider of claim 47 further comprising a quotient output register connected to receive said carry-out bits of said adders and to combine them as plural bits of said N-bit quotient output.

50. The fixed point divider of claim 49 further comprising pipeline registers connected between said carry-out bits of said adders and inputs to said quotient output register.

51. The fixed point divider of claim 50 wherein each said bit subcircuit includes registers for said divisor signal and said data output of said multiplexer.

52. The fixed point divider of claim 51 wherein said shifting means comprises means for appending a "0" to the least significant bit end of said data output and shifting said data output one bit to the left.

53. The fixed point divider of claim 47 further comprising a zero detection means for receiving said dividend signal and outputting an indicating signal which indicates when said dividend signal equals zero, and means for forcing said quotient output to zero when said indicating signal indicates said dividend signal equals zero.

54. The fixed point divider of claim 47 wherein the value of said divisor signal input is greater than or equal to the value of said dividend signal, and further comprising means to shift the dividend signal one bit to the left with respect to the divisor signal before subtracting at an adder that provides the most significant bit output of said N-bit quotient.

55. A floating point divider for dividing a digital fixed point dividend signal input to it by a digital fixed point divisor signal input to it comprising a dividend decoding circuit connected to receive said dividend signal and output a dividend exponent signal indicating the most significant bit position corresponding to the left-most high bit of said dividend signal, a divisor decoding circuit connected to receive said divisor signal and output a divisor exponent signal indicating the most significant bit position corresponding to the left-most high bit of said divisor signal, a dividend shifting circuit connected to receive said dividend signal and output a dividend mantissa signal such that said left-most high bit of said dividend signal is the left-most bit of said dividend mantissa signal, a divisor shifting circuit connected to receive said divisor signal and output a divisor mantissa signal such that said left-most high bit of said divisor signal is the left-most bit of said divisor mantissa signal, a subtraction circuit which subtracts said divisor exponent signal from said dividend exponent signal and provides a quotient exponent signal, and a mantissa division circuit which divides said dividend mantissa signal by said divisor mantissa signal and provides a quotient mantissa signal.

56. The floating point divider of claim 55 wherein said mantissa division circuit comprises an N-bit divider connected to be input with said divisor mantissa signal and said dividend mantissa signal and having bit subcircuits that each provide a single bit output of an N-bit quotient output and receive, except for the most significant subcircuit, a more significant dividend signal and a more significant divisor signal from a more significant subcircuit and output a dividend signal and a divisor signal to a less significant subcircuit.

57. The floating point divider of claim 55 further comprising a quotient mantissa signal barrel shifting circuit connected to shift said quotient mantissa signal by one bit if the most significant bit of said quotient mantissa signal is zero.

58. The divider of claim 57 further comprising a subtractor to subtract one from said quotient exponent signal if the most significant bit of said quotient mantissa signal is zero.

59. The divider of claim 55 further comprising a quotient mantissa signal correction circuit connected to receive said quotient mantissa signal and the most significant bit of said dividend mantissa signal and to output a quotient mantissa signal equal to zero if said received most significant bit of said dividend mantissa signal is equal to zero.

60. The divider of claim 55 further comprising a quotient exponent signal correction circuit connected to receive said quotient exponent signal and the most significant bit of said dividend mantissa signal and to output a quotient exponent signal equal to zero if said received most significant bit of said dividend mantissa signal is equal to zero.

61. The divider of claim 55 further comprising a zero detection circuit connected to receive said divisor exponent signal and to output a maximum value for said quotient exponent signal when said divisor exponent signal equals zero.

62. The divisor of claim 55 further comprising a feedback control module connected to receive signals indicating whether said divisor signal and said dividend signal both equal zero and including logic to output a loop control signal when said divisor signal and said dividend signal both equal zero, a quotient mantissa signal feedback circuit connected to receive a current quotient mantissa signal and said loop control signal and an quotient exponent signal feedback circuit connected to receive a current quotient exponent signal and said loop control signal, said quotient mantissa signal feedback circuit and said quotient exponent signal feedback circuit being connected to output a previous quotient mantissa signal and a previous quotient exponent signal respectively when said loop control signal is asserted.

63. The divider of claim 55 further comprising a divisor exponent signal shifting circuit connected to receive said divisor exponent signal and to add a value to said divisor exponent signal to place said divisor exponent signal within a desired range of values.

64. A video processing system comprising a frame memory circuit having first, second, and third inputs and first, second, and third outputs, first means for converting digital red, green, and blue data inputs into digital hue, saturation, and intensity data outputs, said first, second, and third outputs of said frame memory circuit being connected to be inputted as said red, green, and blue data inputs, said hue, saturation, and intensity data outputs being connected to be inputted as said first, second, and third inputs of said frame memory circuit, second means for converting digital hue, saturation, and intensity data inputs into digital red, green, and blue data outputs, said first, second, and third outputs of said frame memory circuit being connected to be inputted as said hue, saturation, and intensity data inputs, said red, green, and blue data outputs being connected to be inputted as said first, second, and third inputs of said frame memory circuit, and control logic means for controlling which of said first and second means for converting is selected to receive signals from and/or output signals to said frame memory circuit for storage or processing.

* * * * *

UNITED STATES PATENT AND TRADEMARK OFFICE
CERTIFICATE OF CORRECTION

PATENT NO. : 4,916,531

DATED : April 10, 1990

INVENTOR(S) : Suzanne E. Genz
John R. Fierke

It is certified that error appears in the above-identified patent and that said Letters Patent is hereby corrected as shown below:

Column 1, line 39, "process-" should be --Process---;

Column 7, line 65, "SEL1 and SEL1" should be --SEL0 and SEL1--;

Column 8, line 13, "M" should be --M'--;

Column 8, line 27, "M" should be --M'--;

Column 8, line 58, "(H)." should be --(H),--;

Column 9, line 43, "one'clock" should be --one clock--;

Column 9, lines 48 to 49, "two s" should be --two's--;

Column 10, line 7, "signal s" should be --signal's--;

Column 11, line 53, "an" should be --a--;

Column 13, line 14, the third "M" should be --M'--;

Column 13, line 30, "N" should be --N'--;

Column 14, line 64, after "SUM" insert --output, said fixed point divider circuit providing a--;

Column 16, line 60, after "receive" insert --said divisor signal and output a divisor mantissa signal--;

UNITED STATES PATENT AND TRADEMARK OFFICE
CERTIFICATE OF CORRECTION

PATENT NO. : 4,916,531

DATED : April 10, 1990

INVENTOR(S) : Suzanne E. Genz
John R. Fierke

It is certified that error appears in the above-identified patent and that said Letters Patent is hereby corrected as shown below:

Column 17, line 26, delete the two ocurrences of the word "second";

Column 17, line 45, "21" should be --27--;

Column 17, line 67, "hard wired" should be --hard-wired--;

Column 18, line 16, delete the "to" after "3X";

Column 18, line 40, "(IS-ISK=N)" should be --(I+IS-ISK=N)--;

Column 18, line 45, "circuitry" should be --circuit--;

Column 20, line 57, "divisor" should be --divider--;

Column 20, line 65, after "signal" insert --,--;

and

Column 20, line 66, "an" should be --a--.

Signed and Sealed this

Third Day of September, 1991

*Attest:*

HARRY F. MANBECK, JR.

*Attesting Officer*      *Commissioner of Patents and Trademarks*